May 11, 1926.
O. A. BADER
COIL TOOL
Filed Dec. 10, 1923
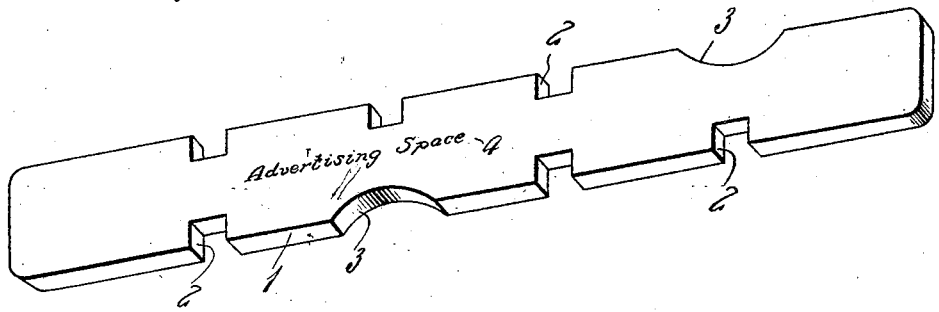
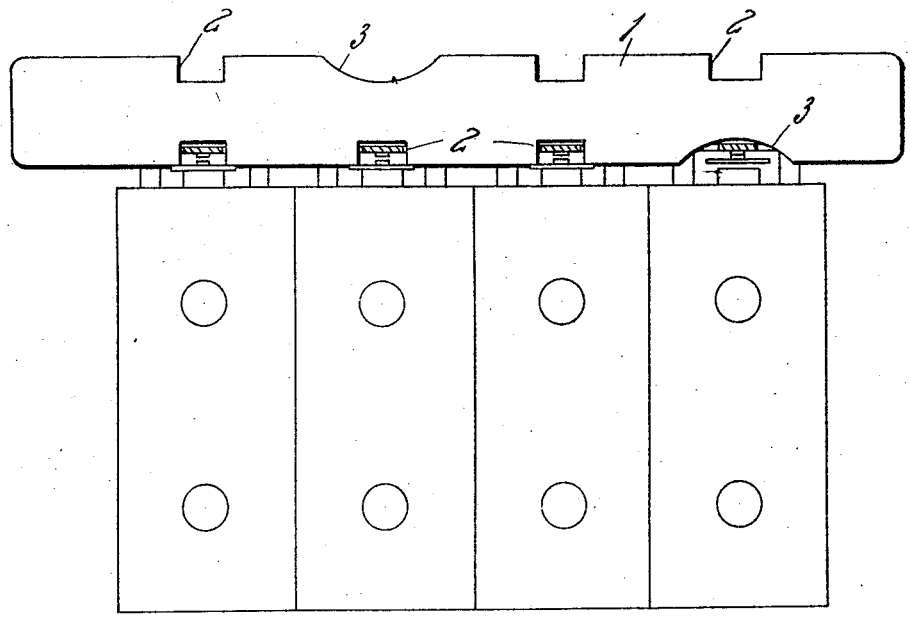

Patented May 11, 1926.

1,584,596

UNITED STATES PATENT OFFICE.

OTTO A. BADER, OF NEW ORLEANS, LOUISIANA.

COIL TOOL.

Application filed December 10, 1923. Serial No. 679,870.

The object of this invention is to provide a tool for testing spark coils of the Ford type of automobile.

Another object of the invention is to so form the device that it can be used for advertising purposes.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view of the device.

Figure 2 is a view showing how it is used.

As shown in these views, the device consists of a strip 1 having three square notches 2 in each edge and a curved notch 3 in each edge, the curved notch in one edge being arranged adjacent one end of the strip and the curved notch in the other edge being arranged between two of the square notches. This strip may contain advertising matter on its faces, as shown at 4.

It is the usual practice to manipulate the vibrators of the coils with the fingers in order to find out whether the motor is working properly. This is rendered difficult to do owing to the small size of the vibrators and many people are afraid to touch the vibrators for fear they will be shocked. This tool will permit the vibrators to be manipulated without touching them and it is so used that the square notches will hold down three of the vibrators while the fourth vibrator is being tested by means of the curved notch. The curved notch adjacent the end of the strip can be used for testing the vibrators of cylinders 1 and 4 while the other curved notch can be used for testing the vibrators of cylinders 2 and 3. This is done by simply reversing the tool as will be understood. Figure 2 shows how the device is used.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A tool of the class described comprising a strip having a number of square notches on each edge thereof and a curved notch on each edge.

2. A tool of the class described comprising a strip having three square notches and a single curved notch at each edge thereof, one curved notch being arranged adjacent one end of the strip and the other between two of the square notches.

In testimony whereof I affix my signature.

OTTO A. BADER.